May 24, 1932.  W. C. KEYS ET AL  1,859,777
CUSHIONING CONNECTION
Filed Dec. 20, 1928
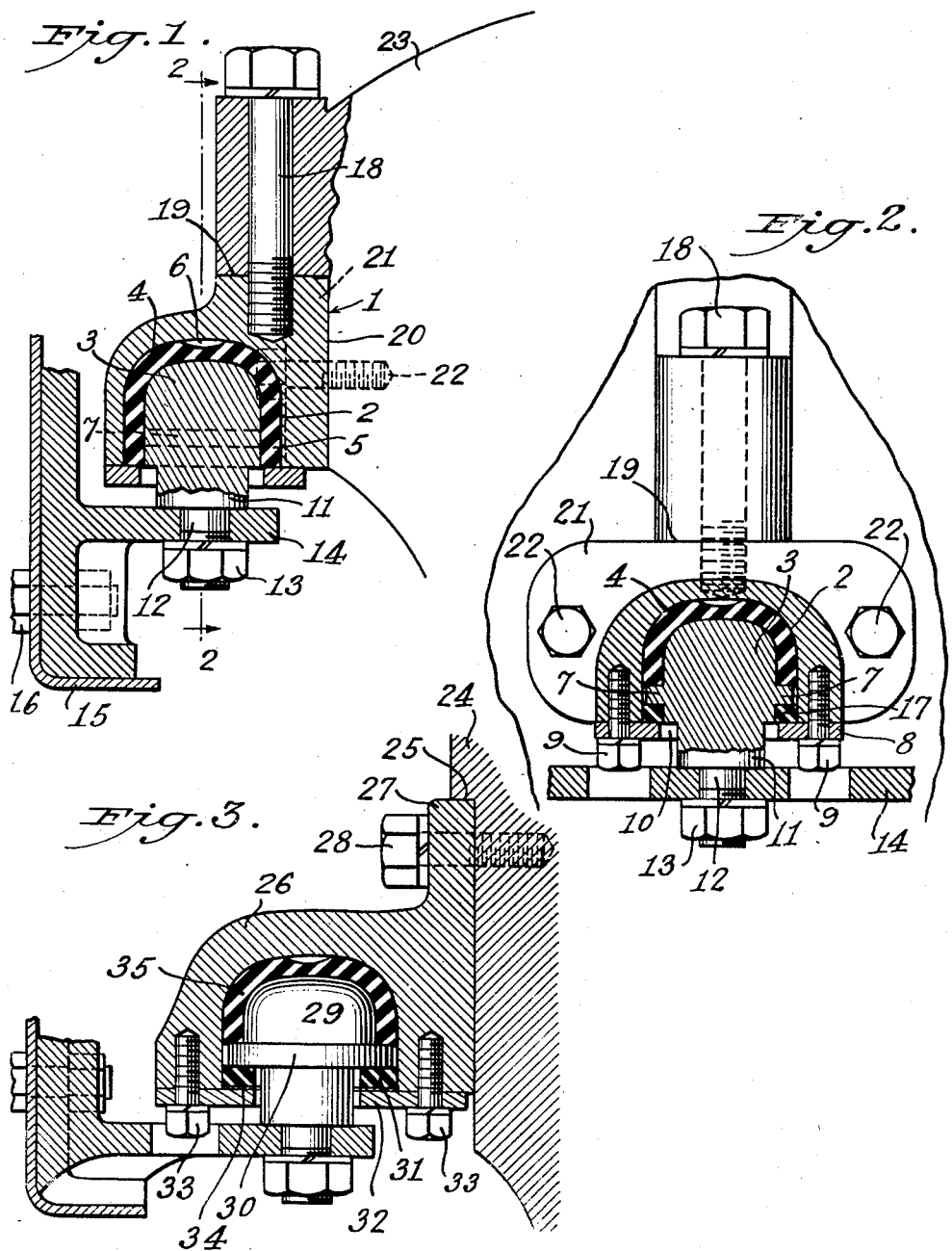
INVENTORS
Walter C. Keys, Hubbard W. Steiner, & Jess G. Eldridge
BY
Ernest H. Atkinson
ATTORNEY Patented May 24, 1932

1,859,777

UNITED STATES PATENT OFFICE

WALTER C. KEYS, HUBBARD W. STEINER AND JESS G. ELDRIDGE, OF DETROIT, MICHIGAN, ASSIGNORS TO THE MECHANICAL RUBBER COMPANY, OF CLEVELAND, OHIO, A CORPORATION OF NEW JERSEY

CUSHIONING CONNECTION

Application filed December 20, 1928. Serial No. 327,318.

This invention relates to non-metallic connections and more particularly to cushion connections such as for mounting automobile engines.

One object of the invention is to provide a device of the above character which embodies simplicity, ruggedness and low manufacturing cost, and which may be readily attached to the motor and the chassis frame of an automobile with a minimum of alterations or additions.

Another object is to provide a connection adapted to provide for lateral stability between the engine and the frame, to absorb high frequency vibrations of small amplitude, and provide a connection in which a relatively large area of cushioning material is interposed between the parts to be cushioned. Further features and advantages will appear upon a consideration of the following specification and accompanying drawings, in which latter—

Figure 1 illustrates in vertical section one practical application of the cushion connection to an automobile;

Fig. 2 is a transverse section on the line 2—2 of Fig. 1 in the direction of the arrows; and Fig. 3 is a view in vertical section of a slightly different form the connection may assume.

Referring to the drawings and especially to Figs. 1 and 2, the reference numeral 1 indicates a metallic member having a cavity 2 in which there is disposed a projection 3 of similar contour to the cavity 2 but of slightly smaller cross sectional dimensions, whereby there is provided between said cavity and the projection, a substantially U-shaped (in cross section) cavity 4. In the cavity 4 there is disposed a cushioning element 5. U-shaped in cross section, preferably of rubber composition and usually provided with a depression or void 6 to permit flow of the cushioning element 5 under compression conditions. The projection member 3 may be provided at its ends only, as indicated in Fig. 2, with flanges 7 disposed within the cavity 4. A plate 8 is secured to the mouth of the cavity 4, as by bolts 9, and has an opening 10 for passage of a stem 11 of the projection 3, which stem is preferably reduced as indicated at 12 and provided with a nut 13 to hold the member 3 to a bracket 14 which in turn is secured to the chassis frame 15 of the car by any suitable means such as by bolts 16. There is interposed between the plate 8 and the lugs 7 a suitable non-metallic material 17, such as rubber or rubber alternated with fabric, which is adapted to substantially seal the cushioning rubber 5 within the U-shaped cavity 4 and to mechanically connect the cavity member 1 to the projection 3 nonmetallically. By this construction the members 1 and 3 are normally pressed together by the material 17 against the cushioning element 5. According to this construction it will be seen, as indicated in Fig. 1, that the rubber on both sides of the projection 3 extends downward substantially to the inner surface of the plate 8 on the sides intermediate the flanges 7, thereby interposing a relatively large amount of rubber laterally between the members.

The member 1 is preferably connected to the engine arm 23 by suitable means including a bolt 18, the engine arm being formed with a shoulder 19 and a lateral face 20. A flange 21 forming a part of the member 1 is connected to the lateral face 20 by bolts 22, so that by the construction described, the engine arm 23 rests upon and is laterally supported by the member 1, providing a substantial support and lateral brace for the engine arm 23.

In the form of the invention shown in Fig. 3, the engine arm 24 is notched as at 25, and a cavity member 26 has a flange 27 by means of which it may be connected by bolts 28 laterally to the engine arm 24. A projection member 29 is similar to the projection member 3 already described in connection with Fig. 1, but differs in the respect that it is provided with a continuous circumferential flange 30 which is backed by a washer of non-metallic material 31 held in place against the flange 30 by a plate 32 secured to the member 26 by bolts 33. Shims 34 may be interposed between the plate 32 and the flange 30 to obtain the proper degree of compression of the projection 29 against the cushioning material 35, which may be similar in composition to the cushioning material already described in connection with Fig. 1. It is to be noted in both constructions that there is no metallic connection between the members 1 and 3 or 26 and 29 within the region thereof contacted by the cushioning material, and that said members are held in cooperative working relation by means including a non-metallic yieldable medium which substantially seals the cushioning material within the U-shaped cavity described.

With the foregoing description, it is evident that various alterations and modifications may suggest themselves to those skilled in the art without departing from the spirit of the invention, and it is therefore not intended to limit the invention except as defined in the appended claims.

Having thus described our invention, what we claim and desire to protect by Letters Patent is—

1. A cushion connection comprising in combination, a pair of metallic members provided respectively with a cavity and a projection extending within said cavity and defining in cross section a U-shaped space between the cavity and said projection, non-metallic cushioning material nearly filling said space, a closure carried by the cavity member and having an opening through which said projection member extends, and nonmetallic yielding material other than said cushioning material associated with the projection and said closure, said projection being provided within said cavity with means disposed at a portion only of its periphery adapted to cooperate with said non-metallic yielding material and said closure to maintain said members in cooperative working relation pressed against said cushioning material, said cushioning material extending over the portions of said periphery between said last named means to the mouth of the cavity, said cushioning material being U-shaped in cross section.

2. A cushion connection comprising in combination, a pair of metallic members provided respectively with a cavity and a projection spaced apart and defining in cross section a substantially U-shaped cavity, cushioning material U-shaped in cross section nearly filling said U-shaped cavity, a plate removably secured over the mouth of said cavity and having a clearance opening for the projection member, said projection member being provided with integral flange portions disposed within said cavity, and non-metallic yielding material intermediate said flange portions and said plate adapted to maintain said metallic members pressed against said cushioning material.

Signed at Detroit, county of Wayne, State of Michigan, this 17th day of December, 1928.

WALTER C. KEYS.
HUBBARD W. STEINER.
JESS G. ELDRIDGE.